United States Patent [19]

Fischer et al.

[11] 4,105,607

[45] Aug. 8, 1978

[54] MODIFIED AIR-DRYING ALKYD RESINS

[75] Inventors: Hannes Fischer, Taunusstein; Gerhard Werner, Glashütten, both of Germany

[73] Assignee: Hoechst Aktiengesellschaft, Frankfurt, Germany

[21] Appl. No.: 792,054

[22] Filed: Apr. 28, 1977

[30] Foreign Application Priority Data

Apr. 28, 1976 [DE] Fed. Rep. of Germany ....... 2618629

[51] Int. Cl.$^2$ .................. C09D 3/56; C09D 3/66; C09D 5/08
[52] U.S. Cl. ................. 260/22 CB; 260/20; 260/23 P; 260/26; 428/480
[58] Field of Search ............ 260/22 CB, 23 P, 20, 260/26; 428/480

[56] References Cited

U.S. PATENT DOCUMENTS

| | | | |
|---|---|---|---|
| 2,397,240 | 3/1946 | Butler | 260/22 R |
| 2,404,836 | 7/1946 | Gerhart et al. | 260/22 CB |
| 2,423,234 | 7/1947 | Gerhart et al. | 260/22 CB |
| 2,530,315 | 11/1950 | Rust et al. | 260/22 CB |
| 3,088,927 | 5/1963 | Dissen | 260/22 CB |
| 3,389,015 | 6/1968 | Scala et al. | 260/22 CB |
| 3,870,667 | 3/1975 | Syson et al. | 260/22 CB |
| 3,986,992 | 10/1976 | Canning et al. | 260/22 CB |

*Primary Examiner*—Ronald W. Griffin
*Attorney, Agent, or Firm*—Littlepage, Quaintance, Murphy, Richardson and Webner

[57] ABSTRACT

A modified air-drying alkyd resin based on a polycarboxylic acid, a polyhydric alcohol, and a monocarboxylic acid having at least 7 carbon atoms, and additionally at least one chemically incorporated copolymer of A) dicyclopentadiene or an alkyl derivative thereof and B) at least one unsaturated compound selected from the group consisting of B1) an olefinically unsaturated carboxylic acid and a derivative thereof, and B2) an olefinically unsaturated alcohol, a coating composition containing said alkyd resin and an article coated with said coating composition.

12 Claims, No Drawings

MODIFIED AIR-DRYING ALKYD RESINS

This invention relates to modified air-drying alkyd resins suitable for use in the production of surface coating compositions having improved properties.

It is known to increase the hardening speed of air-drying alkyd resins by incorporating naturally occuring hard resins, e.g. colophony, or synthetic hard resins, e.g. phenolic resins. However, these compositions generally result in a deterioration in the resistance to yellowing and increased friability of the enamel films produced from them.

Particularly fast drying alkyd resins with improved resistance to yellowing and chemicals have been described, which contain, as the hardening-accelerating components, hydrocarbon resins prepared by polymerising unsaturated aliphatic and/or aromatic hydrocarbons using Friedel-Crafts catalysts and subsequently adding unsaturated polybasic carboxylic acids or the anhydrides thereof.

A process comprising reacting a hydrocarbon resin based on cyclopentadiene with an unsaturated fatty acid and further reacting the reaction product with a polyhydric alcohol and then with an unsaturated dicarboxylic acid compound has been described. Finally, the adduct is also reacted with an epoxy resin.

Coating compositions based on alkyd resins prepared by esterifying a cyclopentadiene-maleic acid adduct with a polyhydric alcohol and reacting this ester with a drying oil, have also been described.

The reaction of a lactone of an adduct prepared from an unsaturated aliphatic dicarboxylic anhydride and dicyclopentadiene carboxylic acid with an unsaturated monocarboxylic acid and a glycol to form an alkyd resin has also been described.

An essential disadvantage of the above-described products is their tendency to discolour on being heated or after long weathering and their expensive production, each requiring several process steps and furthermore giving poor yields.

We have now found that these disadvantages may be avoided or reduced by modified air-drying alkyd resins according to the invention.

According to one aspect of the present invention there is provided a modified air-drying alkyd resin based on a polycarboxylic acid; a polyhydric alcohol; and a monocarboxylic acid having at least 7 carbon atoms; and additionally at least one chemically incorporated copolymer of (A) dicyclopentadiene or an alkyl derivative thereof and (B1) an olefinically unsaturated carboxylic acid or a derivative thereof, or (B2) an olefinically unsaturated alcohol.

The alkyd resins according to the invention have the advantage that they have greater film hardness compared with the alkyd resins known up till now.

Suitable monomers for component (A) of the resins according to the invention are conveniently dicyclopentadiene, methyl dicyclopentadiene or dimethyl dicyclopentadiene.

Suitable carboxylic acid components (B1), of the copolymers include, for example, acrylic, methacrylic, crotonic, maleic, fumaric, itaconic, citraconic and sorbic acids and the anhydrides thereof where possible.

Suitable alcohol components (B2) include, for example, butenol, linoleyl and sorbic alcohol (i.e. 2,4-hexadien-ol), hydroxyethyl or hydroxypropyl acrylate, but preferably allyl alcohol and also butenediols and hexenediols. Alkyd resins which contain a dicyclopentadiene-maleic anhydride copolymer, a dicyclopentadiene-fumaric acid copolymer or a dicyclopentadiene-allyl alcohol copolymer are particularly preferred.

It is also possible to use copolymers which additionally contain at least one further monomer component, generally in a quantity of up to 40, preferably up to 20, particularly up to 10% by weight, based on the total weight of copolymer components. Such monomers include, for example, styrene, vinyl acetate, alkyl esters of acrylic or methacrylic acid or vinyl esters of straight-chained or branched monocarboxylic acids having 6 to 18, preferably 9 to 13 carbon atoms.

The copolymers for incorporation in the resins according to the invention are generally obtained by thermal polymerisation of the starting materials in known manner, e.g. at temperatures up to 300° C, preferably above 200° C, optionally in the presence of one or more solvents and/or at superatmospheric pressures. However, they may also be prepared by polymerisation in the presence of peroxide catalyst known per se in a manner known per se.

The copolymers for incorporation in the resins according to the invention generally have melting points of 40° to 150° C, and the melting points of copolymers containing free carboxyl groups are preferably in the range 50 to 90, particularly 60° to 85° C. The melting points of copolymers containing alcohol groups are preferably in the range 70° to 120° C. The acid number of copolymers containing carboxyl groups (measured in ethanol solution according to DIN 53402) is advantageously 30 to 200, preferably 40 to 140, and particularly 45 to 120. The hydroxyl number of the copolymers containing OH groups (according to DIN 53240) is advantageously 45 to 390, preferably 95 to 195.

Copolymers with a content of carboxylic acid units of 5 to 35, most preferably 9 to 25% by weight, are particularly suitable. If copolymers containing alcohol groups are used, generally those with a proportion of alcohol component of 5 to 40, preferably 10 to 20% by weight are preferred.

In individual cases, it is also possible to use mixtures of copolymers containing carboxylic acid units together with those containing alcohol groups. The ratio of carboxyl groups to alcohol groups in these mixtures may be conveniently in the range 8:2 to 2:8, preferably 6:4 to 4:6, e.g. 1:1.

The amount of copolymer in the alkyd resins according to the invention is generally 5 to 50, preferably 6 to 35, most preferably 7 to 25% by weight, based on the total weight of the alkyd resin. The high concentrations of copolymer are preferably chosen when hydrocarbon resins with a low acid number are used, and on the other hand low cencentrations are generally used when copolymers with a high acid number are used.

If it is desired to modify the alkyd resins further, it may be appropriate to incorporate therein other resins, for example colophony or phenolic or alkyl phenolic resins capable of condensation via methylol groups, namely resols or the like, either alone or in admixture.

Dihydric alcohols, such as ethylene glycol, 1,2- or 1,3-propanediol, the various butanediols, dimethylolcyclohexane, tricyclodecyl diol; furthermore ether of dihydric alcohols, such as oxalkylation products of 4,4'-dihydroxydiphenylpropane; trihydric alcohols such as glycerol and/or trimethylolethane or-propane; and higher functionality alcohols such as pentaerythritol, may be conveniently used as the polyhydric alcohols.

Phthalic acid, maleic acid, isophthalic acid, terephthalic acid, trimellitic acid or an anhydride thereof where possible or a combination thereof are suitable as the polycarboxylic acid components of the alkyd resins.

Naturally occurring oils or fats, such as linseed oil, soya oil, wood oil, cottonseed oil, sunflower oil, safflower oil, but preferably the unsaturated fatty acids obtained therefrom by saponification, other esters of these acids, either alone or in admixture are suitable as a monocarboxylic acid component for the alkyd resins. Moreover, to a lesser extent, naturally occurring saturated fatty acids with 8 to 20 carbon atoms or synthetic saturated, possibly branched fatty acids, such as 2-ethylhexanoic and/or isononanic acid, if desired in the form of their esters, may also be used. It is also possible to at least partially use aromatic acids, such as benzoic acid and/or p-tert-butylbenzoic acid, as the monocarboxylic acid. The total proportion of aromatic acids and saturated monocarboxylic acids used in any monocarboxylic acid component is generally not more than 20, preferably up to 15, but in particular up to 10 mol%, based on the total proportion of monocarboxylic acid component.

The proportion of fatty acids in the alkyd resins according to the present invention is advantageously 28 to 75, preferably 35 to 70% by weight, based on the amount of unmodified alkyd resin or starting alkyd resin used. This unmodified alkyd resin may have a molar excess of 10 to 50, preferably 15 to 40 equivalent % OH groups over the COOH groups. Furthermore, in this unmodified alkyd resin the molar ratio of mono- to polycarboxylic acid is conveniently from 1:0.7 to 1:1.5, the molar ratio of mono-carboxylic acids to polyhydric alcohols is from 1:1.1 to 1:1.8, and the molar ratio of dicarboxylic acids to polyhydric alcohols is from 1:1 to 1:2.5. In every case, mixtures of substances may be used instead of individual compounds.

The modified alkyd resins may be prepared in per se known manner using methods conventional to synthetic resin technology, e.g. by condensing copolymers of (A) dicyclopentadiene or the alkyl derivatives thereof and (B1) olefinically unsaturated carboxylic acids or derivatives thereof or (B2) olefinically unsaturated alcohols as the acid and/or alcohol component, if desired together with other mono- and polycarboxylic acids or polyhydric alcohols, into the alkyd resin. The copolymer may be either esterified in one step together with other raw materials, namely carboxylic acid and alcohols, or, after these other ingredients have been precondensed, incorporated in a later stage of the polycondensation.

The products obtained are clearly soluble in aromatic hydrocarbons and, if the fatty acid content is particularly high, also in aliphatic hydrocarbons.

The alkyd resins prepared according to the present invention and modified by dicyclopentadiene copolymers are suitable for use as binders for air-drying priming and/or coating enamels which are distinguished by their fast drying, high degree of film hardness, good resistance to chemicals and particularly when used in coating enamels, most of all by their good colour consistency and particularly high gloss. They are also suitable as printing ink binders.

In the following Examples, T represents parts by weight and % represents percent by weight. The acid numbers given were in each case determined in ethanol according to DIN 53402.

Unless otherwise stated, the viscosity was in each case determined in 50% xylene solution at 20° C. (mPa.s = milliPascal.sec = cP). The hydroxyl number was determined according to DIN 53240. The melting points were determined according to the capillary method.

EXAMPLE 1

145T of tall oil fatty acid with a resin content of less than 2%, 100 T of phthalic anhydride, 5 T of maleic anhydride and 75 T of glycerol are esterified, after the addition of 10 parts by volume of xylene in an inert gas atmosphere, with azeotropic distillation of the water formed, until the acid number has fallen to less than 5.

Subsequently, 50 T of a copolymer of dicyclopentadiene and maleic anhydride (acid number 64, melting point 65° C, molar ratio 6:1) are added. The mixture is then esterified at 190° C until a final viscosity of 500 mPa.s is reached. The resin is diluted with xylene to form a 60% solution.

The end product, in its solvent-free form, has an acid number of 13 and a hydroxyl number of 53. The iodine colour number of the 50% solution in xylene is 15.

EXAMPLE 2

145 T of an industrial linoleic acid, 75 T of glycerol, 118 T of phthalic anhydride and 5 T of maleic anhydride are heated to 200° C, after the addition of 10 parts of volume of xylene, in a inert gas atmosphere, with azeotropic distillation of the water formed, until the acid number is less than 5. Then 25 T of a copolymer of dicyclopentadiene and maleic anhydride (acid number 59, melting point 78° C, molar ratio 6.5:1) are added. The mixture is esterified at 210° C until a final viscosity of 730 mPa.s is reached. The finished resin is diluted with xylene to form a 70% solution.

If solid resin is used for the calculations, the end product has an acid number of 9 and a hydroxyl number of 102. The iodine colour number of the 50% solution in xylene is 9.

TECHNICAL APPLICATION TESTS

White pigmented air-drying enamels were prepared from the alkyd resins modified by dicyclopentadiene copolymers and obtained according to Examples 1 and 2, and from a standard commercial high quality air-drying industrial enamel alkyd resin based on soya oil fatty acid, benzoic acid, phthalic acid and pentaerythritol, as a comparison, and these enamels were then subjected to technical tests. The enamels were composed as follows: 56.5 T of alkyd resin (60% solids content in white spirit), 28.5 T of titanium dioxide, 1.8 T of bentonite (10% paste in xylene:ethanol = 98:2), 4.29 T of a mixture of various metal octoates as driers, 0.28 T of antiskinning agent (55% in white spirit) and 10.43 T of solvent (xylene and white spirit in a ratio by volume of 1:1).

The results of the technical tests are assembled in Table 1.

TABLE 1

|  | Sample 1 | Sample 2 | Standard Commercial Comparison Sample |
|---|---|---|---|
| Layer Thickness (wet film) | 220 | 200 | 200 |
| Drying in hrs (compressive strength) | 6.5 | 6 | 6.75 |
| Drying out after 24 hrs[1] | 2 | 0 | 4 |
| Film hardness after 24 hrs in sec[2] | 18.5 | 19 | 16 |
| Gloss %[3] | 122 | 110 | 100 |
| Gloss after aging % (24 hrs | 92 | 90 | 84 |

TABLE 1-continued

|  | Sample 1 | Sample 2 | Standard Commercial Comparison Sample |
|---|---|---|---|
| at 100° C) (1) |  |  |  |
| Yellowing | 3 | 2 | 2 |

(1)Assessed according to DIN 53230 (0 = best value, 5 = worst value
(2)Pendulum hardness according to König, according to DIN 53157)
(3)Level of gloss according to Lange at an angle of incidence of 60° according to DIN 67530

EXAMPLE 3

400 T of linseed oil, 200 T of wood oil, 290 T of glycerol and 120 T of a dicyclopentadiene-maleic anhydride copolymer (acid number 56, melting point 79° C, molar ratio 7:1) are esterified at 230° C in an inert gas atmosphere, with distillation of the water, until a clear melt with an acid number of less than 5 is formed. Then, after the addition of 1 T of triphenylphosphite, 470 T of phthalic anhydride and 30 parts by volume of xylene, the mixture is esterified at 190° C in a circulating system, with azeotropic distillation of the water formed, until a final viscosity of 350 mPa.s is obtained, in a 50% concentration in xylene. The finished alkyd resin is diluted with xylene to form a 60% solution. Based on solid material, the end product has an acid number of 15 and a hydroxyl number of 100. The iodine colour number measured in 50% solution in xylene is 30.

TECHNICAL APPLICATION TEST

The modified air-drying alkyd resin prepared according to Example 3 was technically tested in comparison with a standard commercial hard resin-modified alkyd resin consisting of soya oil, wood oil, phthalic acid, glycerol and colophony, in primers composed as follows and differing only in the type of alkyd resins used: 30T of alkyd resin (60% in xylene), 8T of basic zinc chromate, 18T of lithopone, 10T of iron oxide red, 5T of calcium carbonate powder, 5T of talc, 1T of bentonite (15% paste in xylene:ethanol = 98:2), 2T of turpentine, 19.2T of solvent (butanol and xylene in a volume ratio of 8:1), 0.3T of anti-skinning agent (55% in white spirit), 1.5T of a mixture of metal octoates.

The results of the technical tests are assembled in Table 2.

Table 2

|  | Sample 3 | Standard commercial comparison sample |
|---|---|---|
| Non-tacky drying in minutes | 30 | 30 |
| Hardness(1) after 4 hours in seconds | 25 | 25 |
| in seconds after 8 hours | 32 | 30 |
| Erichsen depression mm(2) after 8 days | 3.8 | 2.7 |
| Suitability for being overvarnished(3) | 0 | 0 |

(1)Hardness according to Konig, DIN 53157
(2)According to DIN 53156
(3)Assessed according to DIN 53230 (0 = best value, 5 = worst value)

EXAMPLE 4

300 T of soya oil fatty acid and 92 T of glycerol are esterified at 230° C in an inert gas atmosphere, after the addition of 10 parts by volume of xylene, with azeotropic distillation of the water liberated, until an acid number of less than 10 is obtained. Then 320 T of phthalic anhydride and 120 T of a dicyclopentadiene-maleic anhydride copolymer (acid no. 95, melting point 50° C, molar ratio 4:1) are added to the mixture. The reaction mixture is esterified at 190° C with azeotropic distillation of the water formed, in an inert gas atmosphere until a final viscosity of 900 mPa.s is obtained in a 50% concentration in petrol (boiling point 145/200° C). The finished resin is diluted with petrol (145/200° C) to form a 55% solution. Based on the solid material, the alkyd resin obtained has an acid number of 10 and a hydroxyl number of 39.

Used as a binder in rust-proofing primers, this resin has similarly good technical properties to the product prepared in Example 3.

EXAMPLE 5

290 T of soya oil fatty acid, 105 T of glycerol, 100 T phthalic anhydride, 5 T of maleic anhydride and 180 T of a dicyclopentadiene-maleic anhydride copolymer (acid no. 95, melting point 50° C, molar ratio 4:1) are esterified in two stages in the manner described in Example 4 until a viscosity of 420 mPa.s is obtained. The finished resin is then diluted with xylene to form a 70% solution. Based on the solid material, the end product has an acid number of 8 and a hydroxyl number of 38.

When used in rust-proofing primers, this alkyd resin has similarly good qualities to the products prepared according to Examples 3 and 4.

EXAMPLE 6

290 T of tall oil fatty acid with a resin content of less than 2%, 5 T of maleic anhydride, 133 T of a dicyclopentadiene-maleic anhydride copolymer (acid no. 81.5, melting point 48° C, molar ratio 4.5:1) and 105 T of glycerol are esterified at 190° C, after the addition of 20 parts by volume of xylene, in an inert gas atmosphere, with azeotropic distillation of the water liberated, until the acid number has fallen to less than 10. Then 111 T of phthalic anhydride are added to the mixture. Azeotropic distillation is then continued at 180° to 200° C until a viscosity of 600 mPa.s is obtained. The finished alkyd resin is diluted with xylene to form a 55% solution. Based on the solids, the end product has an acid number of 16 and a hydroxyl number of 33.

The resin is very suitable as a binder for rust-proofing primers, like the products prepared according to Examples 3 to 5.

EXAMPLE 7

640 T of soya oil fatty acid, 180 T of benzoic acid, 385 T of phthalic anhydride and 320 T of pentaerythritol are polycondensed at 240° C after the addition of 30 T of xylene with 145 T of a copolymer of dicyclopentadiene and allyl alcohol in a weight ratio of 8:2, with a melting range of 82 to 85° C and a hydroxyl number of 153, in an inert gas atmosphere with azeotropic distillation of the water formed by esterification, until a viscosity of 5500 mPa.s (55% in a petrol-xylene mixture 4:1) and an acid number of up to 15, based on the solid resin, are obtained. The finished alkyd resin is diluted to a solids content of 55%, using the above-mentioned mixture of solvents.

EXAMPLE 8

640 T of soya fatty acid, 180 T of benzoic acid, 390 T of phthalic anhydride and 305 T of pentaerythritol are heated to 240° C, after the addition of 30T of xylene with 290T of the copolymer of dicyclopentadiene and allyl alcohol described in Example 7, in an inert gas atmosphere with azeotropic distillation of the water formed during esterification, until a viscosity of 3800 mPa.s (55% in a petrol xylene mixture 4:1) and an acid number of up to 15, based on the solid resin, are obtained. The end product is diluted to a solids content of 55%, using the mixture of solvents given.

EXAMPLE 9

640 T of soya oil fatty acid, 180 T of benzoic acid, 350 T of phthalic anhydride and 335 T of pentaerythritol are condensed at 210° to 230° C, after the addition of 35 T of xylene, in an inert gas atmosphere with distillation of the water formed during esterification, until an acid number of less than 10 is reached. Then 155 T of a copolymer obtained from dicyclopentadiene and fumaric acid in a molar ratio of 5:1 and having an acid number of 30 and a softening temperature of 70 to 80° C are added and condensed at 240° C with the alkyd resin formed beforehand until a viscosity of 10000 mPa.s (55% in a benzinexylene mixture 4:1) and an acid number of less than 15, based on the solid resin, are obtained. The end product is diluted with the above-mentioned mixture of solvents to form a 55% solution.

EXAMPLE 10

290 T of tall oil fatty acid with a tall oil resin content of less than 2%, 210 T of phthalic anhydride, 9 T of maleic anhydride and 152 T of glycerol are condensed at 210° C, after the addition of 60 T of xylene, in an inert gas atmosphere, with distillation of the water formed during esterification, until a viscosity of 110 mPa.s (50% concentration in xylene) and an acid number of less than 10 are obtained. Then 290 T of the copolymer given in Example 9 are added. Condensation is then continued at 210° C until the viscosity is 300 mPa.s (50% concentration in xylene). The end product is diluted with xylene to form a 50% solution. The resin has an acid number at 8 to 10, based on solid resin, a hydroxyl number of 45 and a colour number of 30 (in 50% xylene solution).

White industrial enamels were prepared from the alkyd resins produced according to Examples 7 to 10, using the enamel recipe given in Example 2, and these enamels were then subjected to technical application tests, in comparison with a standard commercial industrial enamel alkyd resin. The technical results of these tests are assembled in Table 3; the comparison resin was made up of soya oil fatty acid, benzoic acid, phthalic acid and pentaerythritol and contained about 45% fatty acid.

Table 3

| Sample | 7 | 8 | 9 | 10 | Standard commercial comparison sample |
|---|---|---|---|---|---|
| Layer thickness (wet film) μ | 200 | 200 | 200 | 200 | 200 |
| Drying off in hrs (compressive strength) | 2.33 | 2 | 1.5 | 1.33 | 2.5 |
| Drying out after 24 hrs [(1)] | 0.5 | 0.5 | 0 | 0 | 0.5 |
| Film hardness after 24 hrs in sec. [(2)] | 21 | 21 | 20 | 18 | 17 |
| Gloss (in %)[(3)] | 106 | 114 | 104 | 104 | 98 |
| Film hardness after drying 30'/80° C | 28 | 30 | 26 | 27 | 22 |
| Gloss after drying 30'/80° C | 108 | 110 | 106 | 104 | 104 |

[(1)] to [(3)] see the footnotes for Table 1.

The Table shows the resins modified with copolymers of dicyclopentadiene and allyl alcohol or fumaric acid have good technical properties. In the cases of Samples 9 and 10 which were prepared with dicyclopentadiene-fumaric acid copolymers, the very rapid drying off and drying out are particularly advantageous.

It is not intended that the examples given herein should be construed to limit the invention thereto, but rather they are submitted to illustrate some of the specific embodiments of the invention. Resort may be had to various modifications and variations of the present invention without departing from the spirit of the discovery of the scope of the appended claims.

What we claim is:

1. A modified air-drying alkyl resin based on a polycarboxylic acid, a polyhydric alcohol, and a monocarboxylic acid having at least 7 carbon atoms, and additionally at least one chemically incorporated copolymer of (A) dicyclopentadiene or an alkyl derivative thereof and (B) at least one unsaturated compound selected from the group consisting of (B1) an olefinically unsaturated carboxylic acid and a derivative thereof, and (B2) an olefinically unsaturated alcohol, 2. A resin as claimed in claim 1 wherein the copolymer is selected from the group consisting of a dicyclopentadiene-fumaric acid copolymer, a dicyclopentadiene-maleic anhydride copolymer and a dicyclopentadiene-allyl alcohol copolymer.

3. A resin as claimed in claim 1 wherein the copolymer contains at least one further monomer the amount of additional monomer in the copolymer being at most 40% by weight and wherein in the unmodified starting alkyd resin the molar ratio of mono- to polycarboxylic acids is from 1:0.7 to 1:1.5, that of monocarboxylic acid to the polyhydric alcohols is from 1:1.1 to 1:1.8 and that of the polycarboxylic acid to the polyhydric alcohols is from 1:1 to 1:2.5.

4. A resin as claimed in claim 1 wherein the copolymer has a melting point of 40° to 150° C, a copolymer having free carboxylic groups has an acid number of 30 to 200 and a copolymer having free alcohol groups has a hydroxy number from 45 to 390.

5. A resin as claimed in claim 1 wherein the content of the carboxylic acid units in the copolymer containing free carboxylic groups is from 5 to 35% by weight and wherein the amount of the alcohol component in the copolymer containing free alcoholic groups is from 5 to 40% by weight.

6. A resin as claimed in claim 1 wherein the chemically incorporated copolymer comprises a mixture of at least one copolymer containing carboxylic acid units together with at least one copolymer containing alcohol groups.

7. A resin as claimed in claim 1 wherein the amount of copolymer in the alkyd resin is from 5 to 50% by weight, referred to the total weight of the alkyd resin.

8. A resin as claimed in claim 1 wherein the alkyd resin is further modified by at least one chemically incorporated resin selected from the group consisting of colophony and resols.

9. A resin as claimed in claim 1 wherein the starting alkyd resin additionally contains an aromatic monocarboxylic acid selected from the group consisting of benzoic acid and p-tert.-butylbenzoic acid, the total amount of the aromatic and saturated mono-carboxylic acids in the alkyd resin being at most 20 mol%, referred to the total monocarboxylic acid component.

10. A resin as claimed in claim 1 wherein the amount of the monocarboxylic acid in the alkyd resin is from 28 to 75% by weight referred to the unmodified alkyd resin and wherein the unmodified alkyd resin has a molar excess of 10 to 50 equivalent-% of hydroxy groups over the carboxylic groups.

11. A coating composition comprising as a binder, a modified alkyd resin as claimed in claim 1.

12. An article coated with a coating composition as claimed in claim 11.

* * * * *